A. L. McGREGOR.
AUTOMOBILE BUMPER.
APPLICATION FILED JAN. 17, 1921.
1,372,151. Patented Mar. 22, 1921.
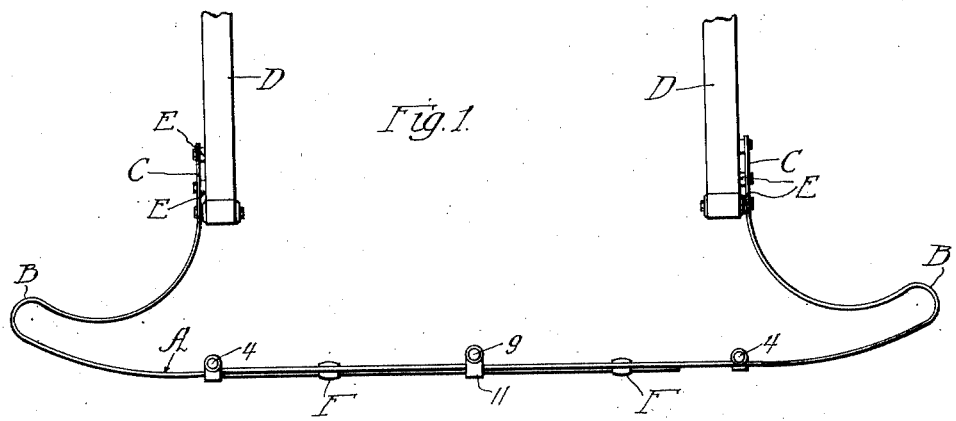
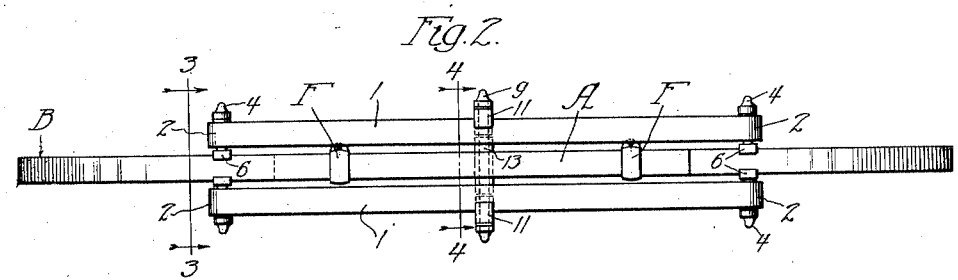
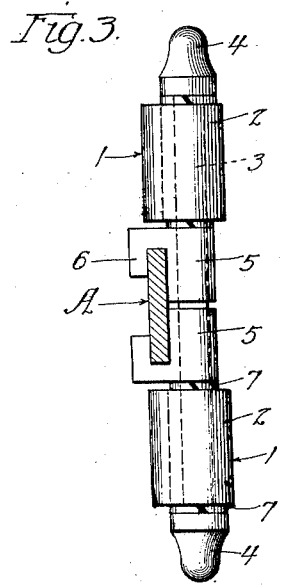
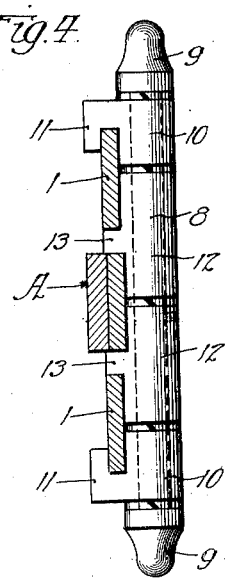
Inventor.
Allan L. McGregor.

UNITED STATES PATENT OFFICE.

ALLAN L. McGREGOR, OF CHICAGO, ILLINOIS.

AUTOMOBILE-BUMPER.

1,372,151. Specification of Letters Patent. Patented Mar. 22, 1921.

Application filed January 17, 1921. Serial No. 437,731.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to an attachment for bumpers of the so-called single bar type; that is, a single impact member extending throughout the length of the bumper and secured at its ends to the frame of a motor vehicle.

The object of the invention is to provide an attachment which may be readily applied to a bumper of the single bar type, whereby a central impact section of increased vertical dimension may be obtained, this attachment being so designed as to permit the conversion of any single bar bumper into a double or twin bar bumper, as the converted type is ordinarily termed.

The construction of the attachment and mode of application is hereinafter fully described in connection with the accompanying drawings, in which—

Figure 1 is a top plan view of a standard type of bumper as attached to a motor vehicle, with the attachment applied thereto, Fig. 2 is a view in front elevation of the same bumper, with the attachment applied, Fig. 3 is an enlarged detail view in vertical section taken on line 3—3 of Fig. 2, and Fig. 4 is a similar view taken on line 4—4 of Fig. 2.

To illustrate the application of the attachment, a common type of bumper has been selected, the same comprising an impact member A extending the full width of the bumper, and having its ends bent rearwardly and inwardly, forming end sections B—B, which terminate in rearwardly extending arms C—C adapted for attachment to the forward ends of the sills or frame members D—D of a motor vehicle by means of suitable clamping members E. The particular type of bumper herein disclosed is preferably formed of two parts or resilient bars, each bent to form one-half of the complete structure, the ends of these parts overlapping each other throughout the central portion of the impact member A, and clamped together by means of clamping collars F located on either side of the central point of the impact member A. This particular construction is adopted in order that the bumper may be adjustable lengthwise to accommodate varying widths between the frame members D—D of different makes of motor vehicles.

Referring now to the construction of the attachment especially designed to be secured to a bumper such as heretofore described, the same comprises in general two auxiliary bars 1—1, preferably made of a similar resilient stock, and having the same general dimensions as the bars of the bumper itself, these bars, however, being considerably shorter than the length of the impact member A, and as will be seen, are adapted to extend throughout the central portion thereof. These bars, which may be termed auxiliary bars, extend parallel to each other, and with the impact member A, one being spaced above, and one below said impact member. As a means for detachably connecting the auxiliary bars 1—1 to the bumper, and directly to the impact member A thereof, the following construction is employed: The ends of the auxiliary bars are bent to form eyes 2, through which are inserted pins or bolts 3, as clearly shown in Fig. 3. These pins extend transversely of the auxiliary bars 1—1, the ends of said pins extending through and beyond the eyes 2 and surmounted by means of caps or nuts 4—4 having screw threaded engagement with the ends of the pins. Between the ends of the auxiliary bars 1—1 and slidably mounted upon the intermediate portion of the pins 3, are clamping blocks 5—5 provided with oppositely facing jaws 6—6 which are adapted to engage the bar of the impact member A of the bumper. As a preferable construction, the ends of the auxiliary bars 1—1 are spaced from the screw caps 4—4, and the clamping blocks 5—5, by means of split washers 7.

It is evident that by removing one of the screw caps 4 from its pin 3, the latter can be removed, thus disassembling all of the parts of the attachment. In a similar manner, the attachment can be re-assembled, and at the same time attached to the bumper by including the bars of the impact member A between the clamping blocks 5—5 at either end of the attachment, the same being tightly secured in desired position by screwing the caps 4 down tightly. In order to provide a stronger construction, as well as a more rigid one, the central portion of the auxiliary bars 1—1 are secured or anchored to the corresponding portion of the impact member A by a connection somewhat similar to that employed at the ends of the auxiliary bars. In this connection, as clearly shown in Fig. 4, a pin 8 provided with screw caps 9—9 is used, there being loosely mounted on the pin intermediate its ends a pair of clamping blocks 10—10 at the outer ends of the pin, these blocks being provided with inwardly facing jaws 11—11 adapted to engage the outer edges of the auxiliary bars 1—1. Between the blocks 10—10 is a pair of spacer blocks 12—12 provided with lugs 13—13 adapted to be inserted between the auxiliary bars 1—1 and the impact member A, which at this point is equal to the thickness of two bars. This central connection is capable of being assembled in the same manner as the end connections, although it has no clamping connection with the impact member A, but simply serves to maintain the auxiliary bars 1—1 in parallel spaced relation with the impact member A, and further, to tie the auxiliary bars together through the medium of the clamping blocks 10—10. In short, the central connecting member provides an additional connection between the parts, thus affording greater strength and rigidity to the complete structure, as already suggested.

The adaptability of the attachment to any standard type of single bar bumper is provided for by the construction described, it being evident that a considerable degree of adjustability is permitted in the spacing of the auxiliary bars, as well as the clamping blocks, thus permitting the application of the attachment to various makes of bumpers which may differ in the dimensions of the bar forming the impact member A. Moreover, the fact that the invention is described as an attachment does not preclude the possibility of complete bumpers being made in accordance with the invention, and, therefore, it is not my wish to limit the scope of the invention in this respect.

Having described the invention, I claim:

1. In a bumper having a single bar extending the length thereof, the combination of an attachment comprising an auxiliary bar adapted to be connected to said single bar intermediate the ends thereof, pins connected with the ends of said auxiliary bar, and clamping members mounted on said bolts, and having clamping engagement with said single bar.

2. In a bumper, the combination of a single bar extending the length thereof, an auxiliary bar adapted to be secured in vertically offset relation thereto, and pins connected to said auxiliary bar and provided with clamping members adapted to engage said single bar.

3. In a bumper, the combination of a single impact bar, extending the length thereof, an auxiliary bar secured to the central portion of said bar and spaced vertically therefrom, a pin extending through eyes formed at the ends of said auxiliary bar, and clamping blocks rotatably mounted on said pins and adapted to be fixed in clamping engagement with said single bar.

4. In a bumper, the combination of a single impact bar, and an attachment therefor comprising a bar, pins loosely connected with the ends of said bar, clamping blocks mounted on said pins, and adapted for fixed connection with said impact bar.

5. In a bumper, the combination of a resilient impact member having the width of a single bar, of an attachment comprising auxiliary bars connected together at their ends in spaced relation by means including pins, blocks slidably mounted on said pins, and adapted to engage said impact member.

6. In a bumper, the combination of an impact member extending the length of said bumper, a plurality of auxiliary bars adapted to be attached intermediate the ends of said impact members, said bars being loosely connected together at their ends by means of pins, and blocks mounted on said pins and provided with jaws adapted to engage said impact member, and means for connecting said auxiliary bars and impact member intermediate the ends of said auxiliary bars.

7. In a bumper, the combination of a resilient impact bar, and auxiliary bars adapted to be secured in vertically spaced relation thereto, pins extending through eyes formed at the ends of said auxiliary bars, clamping blocks mounted on said pins, and adapted to engage said impact bar, and a connection intermediate the ends of said auxiliary bars comprising a pin, a pair of clamping blocks engaging said auxiliary bars, and a spacing block having lugs extending between said auxiliary bars and impact bar, and mounted on said pin.

In witness whereof, I hereunto subscribe my name this 11th day of January, A. D. 1921.

ALLAN L. McGREGOR.